United States Patent [19]

Scott

[11] 4,210,985
[45] Jul. 8, 1980

[54] SLIDE FASTENER STRINGER WITH FOLDED AND BONDED CONTINUOUS MOLDED COUPLING ELEMENT AND METHOD AND APPARATUS FOR MANUFACTURING

[75] Inventor: George W. Scott, Conneaut Lake, Pa.

[73] Assignee: Textron, Inc., Providence, R.I.

[21] Appl. No.: 687,074

[22] Filed: May 17, 1976

[51] Int. Cl.² .............................................. A44B 19/24
[52] U.S. Cl. ............................................. 24/205.16 R
[58] Field of Search ............... 24/205.16 R, 205.13 D, 24/205.13 R, 205.16 C

[56] References Cited

U.S. PATENT DOCUMENTS

| 1,992,254 | 2/1935 | Sundback | 24/205.13 R |
| 3,328,857 | 7/1967 | Burbank | 24/205.13 |
| 3,665,561 | 5/1972 | Heimberger . | |
| 3,696,473 | 10/1972 | Jones | 24/205.13 R |
| 3,732,601 | 5/1973 | Rojahn | 24/205.13 D |
| 3,928,098 | 12/1975 | Moertel . | |
| 3,946,465 | 3/1976 | Moertel | 24/205.16 C |
| 3,975,801 | 8/1976 | Moertel | 24/205.16 C |
| 4,033,014 | 7/1977 | Manning . | |

FOREIGN PATENT DOCUMENTS 408238  5/1942  Italy ................................. 24/205.13 R Primary Examiner—Kenneth J. Dorner
Attorney, Agent, or Firm—O'Brien & Marks

[57] ABSTRACT

The leg portions of a continuous molded coupling element are bonded together to reinforce the attachment of connecting threads embedded in the leg portions.

2 Claims, 4 Drawing Figures

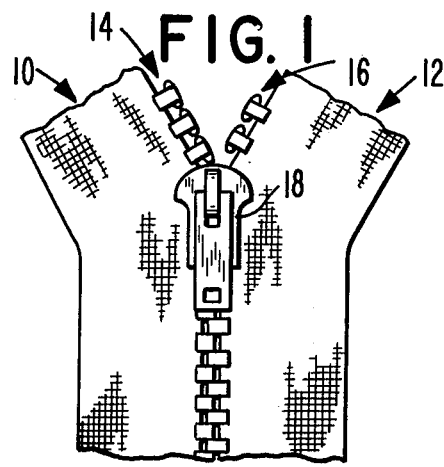
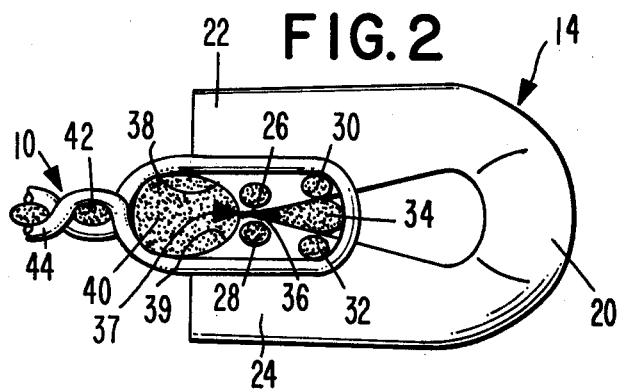
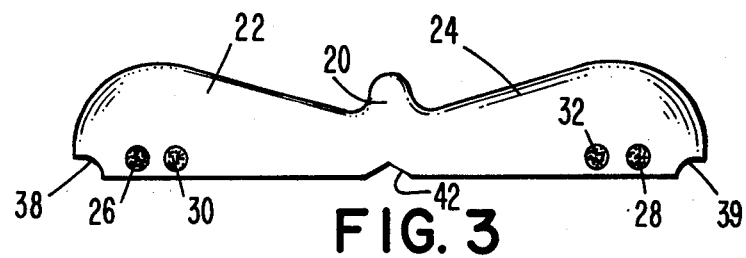
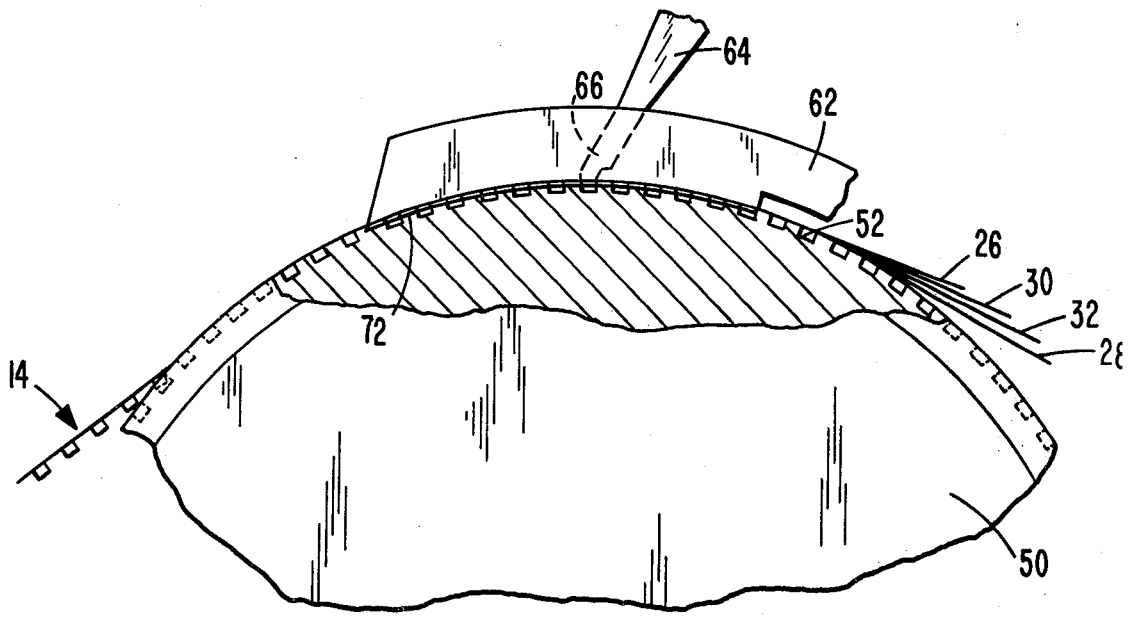

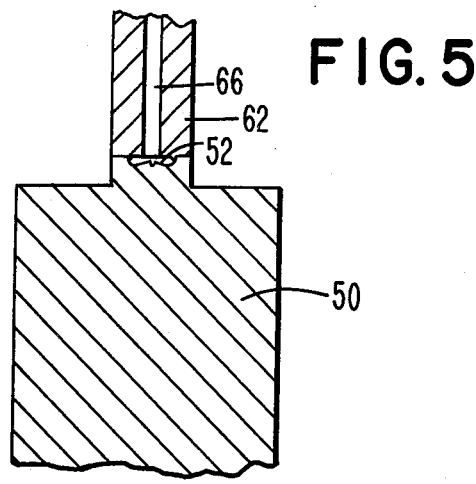
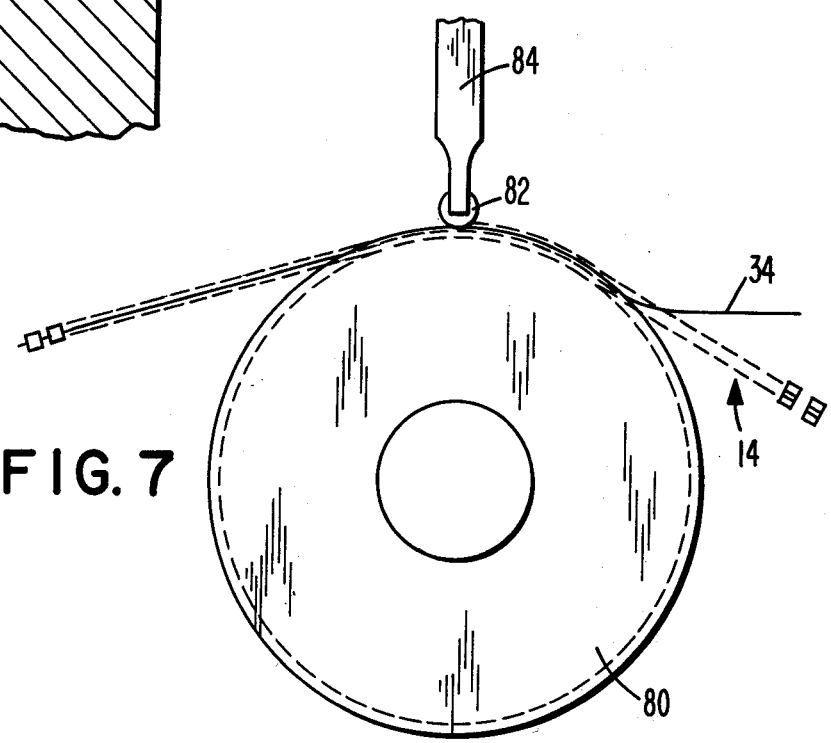
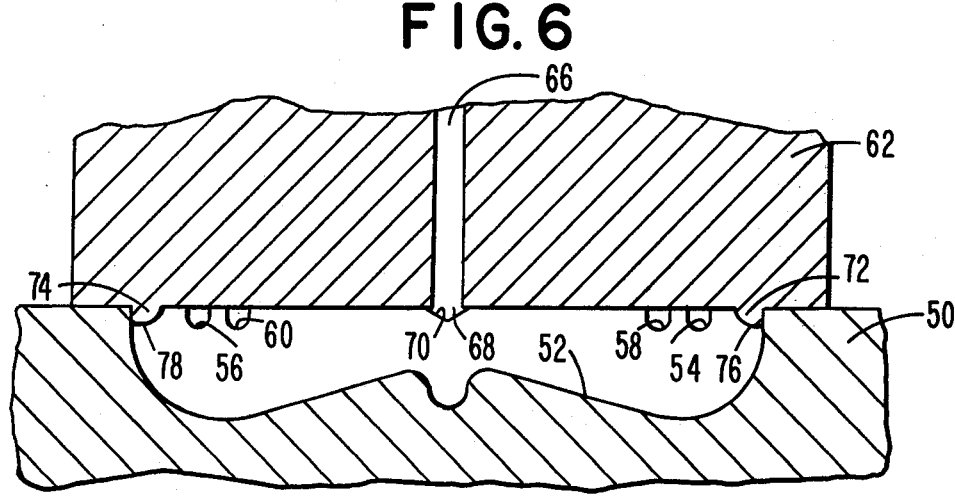

SLIDE FASTENER STRINGER WITH FLODED AND BONDED CONTINUOUS MOLDED COUPLING ELEMENT AND METHOD AND APPARATUS FOR MANUFACTURING

BACKGROUND OF THE INVENTION

1. Field of the Invention

The invention relates to slide fasteners and particularly to slide fasteners employing continuous molded coupling elements joined in a train by connecting threads as well as their methods and apparatus for manufacture.

2. Description of the Prior Art

The prior art, as exemplified in U.S. Pat. No. 3,328,857, No. 3,414,948, No. 3,445,915 and No. 3,487,531, contains a number of continuous molded coupling elements joined by embedded connecting threads and methods and apparatus for manufacture thereof. Generally, the connecting threads in such prior art coupling elements are unsuitable for use as the means of attachment to a carrier tape since the connecting threads are embedded relatively shallowly in the legs of the coupling elements and are easily pulled from coupling elements by cross-wise forces on the slide fastener; thus the leg portions of the prior art coupling elements are generally sewn to the edge of the tape. Such sewing of the leg portions to the tapes results in increased cost and extra steps in the manufacture of the coupling elements.

SUMMARY OF THE INVENTION

The invention is summarized in a stringer for a slide fastener including a tape, a train of molded synthetic polymer coupling elements disposed along one longitudinal edge of the tape, each of the coupling elements having a head portion and a pair of leg portions which extend in the same direction from opposite sides of the head portion, first and second connecting thread means having segments embedded in the respective leg portions to connect the coupling elements in the train, the leg portions being bonded together adjacent their heels, and securing thread means extending around the connecting thread means between the coupling elements to secure the train of coupling elements to the one edge of the tape.

An object of the invention is to construct a slide fastener stringer having a continuous molded coupling element joined by connecting threads and woven together in the edge of a tape by using present weaving techniques.

Another object of the invention is to reinforce embedded connecting threads joining continuous molded coupling elements in order to withstand cross-wise forces on a slide fastener.

It is also an object of the invention to weld the heels of the leg portions of coupling elements together to reinforce connecting threads joining the coupling elements as well as to seal in an invested cord between the leg portions.

One feature of the invention is the formation of a groove in the joined heels of leg portions of coupling elements to receive a longitudinal cord and improve the stability of the coupling elements relative to the tape.

Another feature of the invention is that one-half of a cord receiving groove is formed in the heel of each leg portion during the molding of the slide fastener.

In still another aspect, the bending of leg portion continuous molded coupling elements is improved forming notches on the inside of head portions of coupling element. Other objects, advantages, and tures of the invention will be apparent from the foll ing description of the preferred embodiment take conjunction with the accompanying drawings.

BRIEF DESCRIPTION OF THE DRAWING

FIG. 1 is a plan view of a slide fastener made in cordance with the invention.

FIG. 2 is a cross section view of a portion of stringer of the slide fastener of FIG. 1.

FIG. 3 is a side view of a molded coupling elen during an intermediate step of forming a coupling ment for the stringer of FIG. 1.

FIG. 4 is a front view of a portion of an apparatus continuously molding a train of the coupling elem of FIG. 3.

FIG. 5 is a side cross section view of the molc apparatus of FIG. 4.

FIG. 6 is an enlarged view of a portion of the c section view of FIG. 5.

FIG 7. is a front view of an apparatus for bonding portions of the coupling elements of FIG. 2 togeth

DESCRIPTION OF THE PREFERRED EMBODIMENT

A slide fastener, shown in FIG. 1 and manufactu in accordance with the invention, includes a pai carrier tapes indicated generally at 10 and 12 and a of trains of coupling elements indicated generally a and 16 secured to the inner edges of the respective ta 10 and 12. A slider 18 is slidably mounted on the c pling elements 14 and 16 for opening and closing slide fastener. The tape 10 and coupling elements form a left stringer while the tape 12 and the coup elements 16 form a right stringer; the left and ri stringers together forming a chain for the slide faste The right stringer is substantially identical to the stringer except that it is a mirror image thereof.

Each of the coupling elements 14 as illustratec FIG. 2 has a head portion 20 with a pair of leg porti 22 and 24 extending in the same direction from oppc sides of the head portion 20. Four connecting thre 26, 28, 30 and 32 are embedded in the leg portion and 24 near converging inside surfaces thereof; one of the connecting threads 26 and 28 being embedde the respective leg portions 22 and 24 adjacent to heels thereof while the other pair 30 and 32 are emt ded in the respective leg portions 22 and 24 at a loca spaced toward the head portion 20 from the pai threads 26 and 28. An invested cord 34 is positio between the leg portions 22 and 24 which are bonde sealed together, such as by a weld 36, formed adjac to the heels of the leg portions 22 and 24. Well groove halves 38 and 39, together forming a si groove indicated generally at 37, are formed in the h of the prospective leg portions 22 and 24 to accom date a support cord 40. The tape 10 has a pluralit warp threads 42 with an interwoven weft thread which encircles the support cord 40 together with connecting threads 26, 28, 30 and 32 and the inve cord 34 between the coupling elements 24 to secure train of coupling elements 14 to the inner edge of tape 10.

The bond 36 formed between the leg portions 22 24 adjacent the heel thereof substantially increases th of the attachment of the coupling elements 14 tape 10. The connecting threads 26, 28, 30 and 32, only shallowly embedded in the coupling ele-14 on the inside of the leg portions 22 and 24, a tendency to be pulled from the coupling ele-14 in absence of the bond 36; but the bond 36 inside surfaces of the leg portions 22 and 24 to-r to form a unitary heel portion with the connect-ireads, particularly threads 26 and 28, centrally ided therein, to greatly reinforce the union of the cting threads 26, 28, 30 and 32 with the leg por-22 and 24. Also, the bond 36 seals in the invested 34 capturing it between the leg portions 22 and 24. capturing the invested cord 34, it reinforces the of the connecting threads, particularly the ls 30 and 32, due to compression between the leg ms 22 and 24 adjacent the threads 30 and 32; the ed cord 34 also provides an additional member of vely greater strength to help withstand crosswise fastener forces transmitted through picks of the thread 44. Being located between the connecting ls 30 and 32 as well as absorbing a substantial of the tension forces of the weft thread picks, the ed cord 34 maintains spacing between the threads d 32 and decreases distortion of the spacing be-coupling elements due to pulling of the weft i picks on the threads 30 and 32.

groove 37 with the support cord 40 being laid n greatly improves the stability of the coupling nts 14 and their attachment to the tape 10. In on to greatly increasing the longtudinal strength ability of the inner edge of the tape 10, the cord 40 groove 37 prevents the elements 14 from moving ays relative to the tape 10. The support cord 40 ler with the invested cord 34 and the connecting ls 26, 28, 30 and 32 form a substantial package ally joined with the leg portions 22 and 24 of the ing elements 14 for attachment by the encircle-of the weft thread 44 on the inner edge of the tape apparatus, shown in FIGS. 4, 5 and 6, for continu-molding the coupling elements 14 in an elongated, nd unfolded condition, as shown in FIG. 3, in-s a rotatable cavity wheel 50 having a plurality of d elongated cavities 52 formed in a row around the hery thereof. The cavities 52 extend parallel to the f the wheel 50. A plurality of annular grooves 54, and 60 are formed in the periphery of the wheel r receiving the respective connecting threads 26, and 32 to intersect end or leg forming portions of ivities 52. Slidingly engaging the periphery of the l 50, a stationary injection shoe 62 has a passage-6 communicating between a molten thermoplastic ion means and the cavities 52 as the cavity wheel rotated. Also, the shoe 62 has a V-shaped project-b 68 mating with a V-shaped annular groove 70 d in the periphery of the wheel 50 and intersecting forming portions of the cavities 52 for forming es 42, FIG. 3, in the coupling elements 14. Sides of b 68 extend into the leg forming portions of the es 52 adjacent the head forming portion. Pro-g ribs 72 and 74 on the shoe 62 mate with annular res or channels 76 and 78 formed in the periphery wheel 50 and intersecting the outer edges or heels leg forming portions of the cavities 52 for form-le groove halves 38 and 39 in the heels of the leg ms 22 and 24 of the coupling elements 14.

An apparatus for welding the leg portions 22 and 24 of the coupling elements 14 together after insertion of the invested cord 34 is illustrated in FIG. 7. A rotatable wheel 80 is notched with a spacing coinciding with the proper spacing of elements 14 to receive the coupling elements 14 bent into a U-shape. Suitably disposed above the wheel 80 is a smaller wheel 82 rotatably mounted on the lower end of an ultrasonic vibration mechanism 84, for further bending and welding the leg portions 22 and 24 together.

In the method of manufacture of the left stringer for the slide fastener, the coupling elements are initially molded in the apparatus of FIGS. 4, 5 and 6 by injecting molten synthetic polymer resin through the passage 66 into the cavities 52 as the cavities 52 are moved beneath the shoe 62. The connecting threads 26, 28, 30 and 32 fed into the respecting grooves 54, 56, 58 and 60 of the cavity wheel 50 beneath the shoe 62 became embedded in the injected polymer resin. After hardening, the train of coupling elements 14, in the flat unfolded condition of FIG. 3 and joined in a train by the connecting threads 26, 28, 30 and 32, are stripped or removed from the cavity wheel 50. The groove halves 38 and 39 and the V-shaped groove 42 are formed by the respective ribs 72, 74 and 68 during the formation of the trains of un-folded coupling elements.

Subsequently, the coupling elements 14 are suitably folded into a U-shape with the leg portions 22 and 24 extending in the same direction, the cord 34 is inserted between the leg portions 22 and 24, and the train of coupling elements 14 with the invested cord 34 is fed to the periphery of the wheel 80, FIG. 7. Ultrasonic energy from the wheel 82 welds the leg portions 22 and 24 together at 36 as shown in FIG. 2; the welding also forming the grooves 37 from the halves 38 and 39. The train of coupling elements 14 with the sealed leg portions is fed to a conventional slide fastener weaving apparatus along with the cord 40 which is laid in the grooves 37. The weft thread 44 is woven with the warp threads 42 and is passed around the package of cords 34 and 40 and threads 26, 28, 30 and 32 between the coupling elements 14 to form a woven slide fastener stringer.

Folding of the leg portions 22 and 24 is aided by the V-shape grooves 42. The sides of the grooves 42 extending into the leg portions 22 and 24 narrows the junctions of the leg portions with the head portion 20 making such junctions more flexible and easier to bend.

Forming the grooves 37 by forming the two groove halves in the heels of the respective leg portions 22 and 24 as they are molded avoids extra steps in manufacturing the coupling elements. Additionally distortion, such as would be caused by plastically deforming the heels of the leg portions after they have been bonded together, is avoided; thus producing coupling elements with uniform dimensions.

Since many modifications, variations and changes in detail may be made to the described slide fastener and its method and apparatus for manufacture it is intended that all matter in the foregoing description and shown in the accompanying drawings be interpreted as illustrative and not in a limiting sense.

What is claimed is:
1. A stringer for a slide fastener comprising
   a tape,
   a train of molded synthetic polymer coupling elements disposed along one longitudinal edge of the tape, each of said coupling elements having a head portion and a pair of leg portions which extend in the same directon from opposite sides of the head portion, said leg portions terminating in heels thereof opposite to the head portions, first and second connecting thread means having segments embedded in the respective leg portions to connect the coupling elements in the train, said leg portions being bonded together adjacent their heels, securing thread means extending around the connecting thread means between the coupling elements to secure the train of coupling elements to the one edge of the tape, said coupling elements each including a groove formed in the joined heels of the leg portions, said grooves extending longitudinal to the tape, and a support cord in the one edge of the tape laying in the grooves of the coupling elements.

2. A stringer for a slide fastener comprising a tape, a train of molded synthetic polymer coupling elements disposed along one longitudinal edge of the tape, each of said coupling elements having a head portion and a pair of leg portions which extend in the same direction from opposite sides of the head portion, said leg portions terminating in heels thereof opposite to the head portions, first and second connecting thread means having segments embedded in the respective leg portions to connect the coupling elements in the train, said leg portions being bonded together adjacent their heels, an invested cord between the leg portions, securing thread means extending around the connecting thread means and the invested cord between the coupling elements to secure the train of coupling elements to the one edge of the tape, said coupling elements each including a groove formed in the joined heels of the leg portions, said grooves extending longitudinal to the tape, and a support cord in the one edge of the tape laying in the grooves of the coupling elements.

* * * * *